(12) United States Patent
Winter

(10) Patent No.: US 6,423,915 B1
(45) Date of Patent: Jul. 23, 2002

(54) SWITCH CONTACT FOR A PLANAR INVERTED F ANTENNA

(75) Inventor: James Blake Winter, Lincoln, NE (US)

(73) Assignee: Centurion Wireless Technologies, Inc., Lincoln, NE (US)

( * ) Notice: Subject to any disclaimer, the term of this patent is extended or adjusted under 35 U.S.C. 154(b) by 0 days.

(21) Appl. No.: 09/916,016

(22) Filed: Jul. 26, 2001

(51) Int. Cl.[7] .................................................. H04B 1/38
(52) U.S. Cl. ........................ 200/292; 343/895; 343/702; 455/90; 455/575
(58) Field of Search ................................. 200/292, 275, 200/333, 252, 61.71; 343/702, 866, 870, 871, 872, 873, 878, 880, 883, 906; 379/433.01, 433.02, 433.05, 433.11, 433.12, 440; 455/90, 550, 575

(56) References Cited

U.S. PATENT DOCUMENTS

| | | | |
|---|---|---|---|
| 4,050,051 A | * 9/1977 | Kadar et al. | 200/252 |
| 6,034,636 A | 3/2000 | Saitoh | 343/700 MS |
| 6,151,485 A | * 11/2000 | Crisp | 379/433.12 |
| 6,269,240 B1 | * 7/2001 | Chong et al. | 455/129 |
| 6,282,436 B1 | * 8/2001 | Crisp | 455/575 |
| 6,337,663 B1 | * 1/2002 | Chi-Ming | 343/700 MS |
| 6,337,669 B1 | * 1/2002 | Chiang | 343/702 |

* cited by examiner

Primary Examiner—Michael Friedhofer
(74) Attorney, Agent, or Firm—Thomte, Mazour & Niebergall; Dennis L. Thomte

(57) ABSTRACT

A switch contact for a wireless communication device is disclosed which is comprised of a generally U-shaped spring contact positioned between a printed circuit board and a planar inverted F antenna in a compressed state for electrically connecting the printed circuit board to a feed point on the planar inverted F antenna. The leg portions of the spring contact are provided with spring extensions which are overlapped and which are biased towards one another.

6 Claims, 2 Drawing Sheets

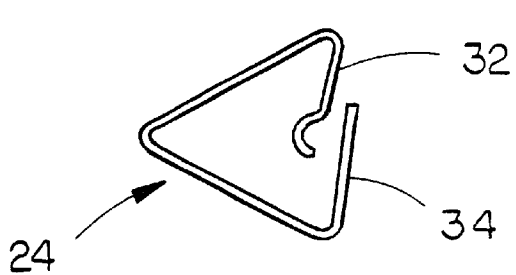
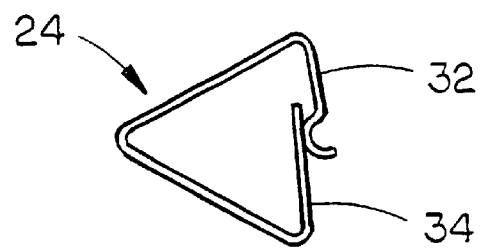
FIG. 3A                FIG. 3B
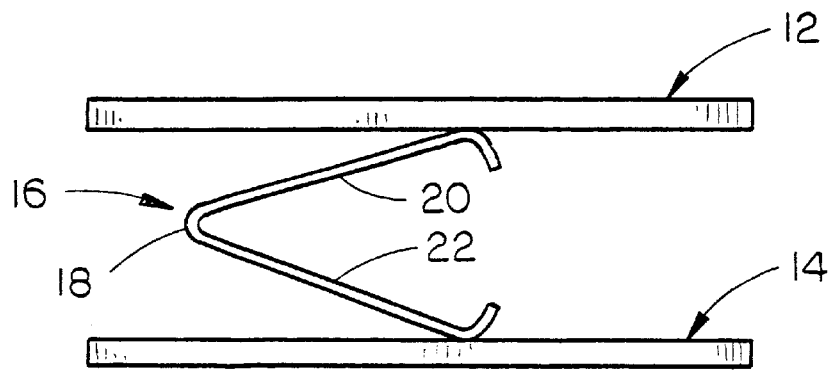
FIG. 4
(PRIOR ART)
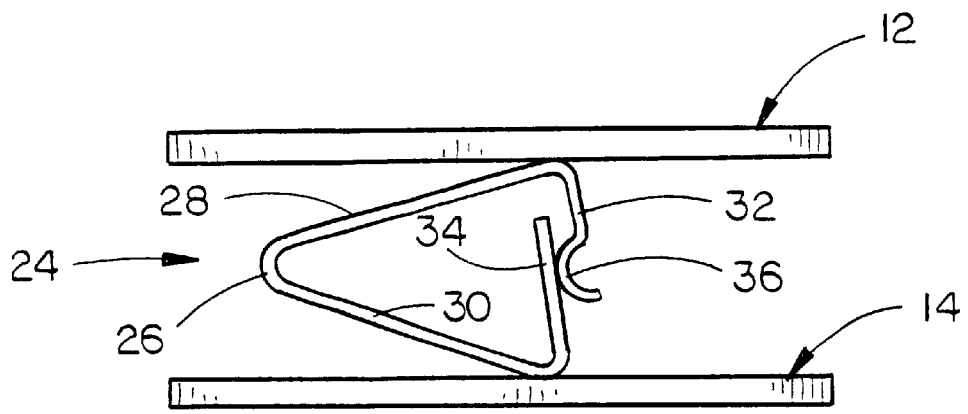
FIG. 5

SWITCH CONTACT FOR A PLANAR INVERTED F ANTENNA

BACKGROUND OF THE INVENTION

1. Field of the Invention

This invention relates to internal antennas for hand-held mobile telephones and wireless communication devices. More particularly, the present invention relates to a switch contact for connecting a planar inverted F antenna in the device to a printed circuit board therein.

2. Description of the Related Art

Internal antennas for wireless communication devices are becoming more popular due to their ease of integration into the housing of the device, lower cost, and smaller profile. A popular internal antenna is the planar inverted F antenna (PIFA). A major difficulty encountered in mass production of a PIFA is the method used to inexpensively provide a connection between the signal on the printed circuit board (PCB) to the feed point on the PIFA. The simplest method is to insert spring contacts that apply pressure between the PCB and the PIFA. The proper amount of pressure is crucial for making a consistent, reliable electrical connection.

Spring contacts of the type described above may be configured in different ways. One way is to use what is called a "pogo" pin. The pogo pin is made of a spring housed inside two closed end concentric tubes. The spring provides pressure to the tubes to press against both the PCB and the PIFA. The tubes hold the spring, provide an electrical path, and enclose the spring to eliminate the inductance of the spring. However, pogo pins are usually too expensive for use in mass production.

Another method of configuring the spring contact is to form metal strips into beams that perform all the functions mentioned hereinabove. The beams are necessary to prevent deformation of the metal strips due to flexing the metal during switching. Deformation reduces the spring force of the metal. Unfortunately, the spring portion of the contact is not enclosed to eliminate the induction. In most cases, the additional induction causes the electrical size of the PIFA to be smaller to compensate for the inductance. Smaller electrical size in general means the gain will be lower.

SUMMARY OF THE INVENTION

A switch contact is disclosed for a wireless communication device including a printed circuit board having a planar inverted F antenna arranged parallel thereto and spaced therefrom. For purposes of description, the printed circuit board will be described as being positioned below the planar inverted F antenna. The spring contact is generally U-shaped and is positioned between the printed circuit board and the planar inverted F antenna in a compressed state for electrically connecting the printed circuit board to a feed point on the planar inverted F antenna. The spring contact includes a base portion having spaced-apart first and second leg portions extending therefrom. The first leg portion of the spring contact curves laterally and upwardly from the PCB, bends 180 degrees over a relatively large radius (base portion), with the second leg portion curving laterally and upwardly to the PIFA. The first leg portion is in electrical contact with the printed circuit board with the second leg portion being in electrical contact with the feed point on the planar inverted F antenna. The spring contact forms the mechanical portion of the contact that provides upward and downward spring force to ensure good electrical connection between the surface of the PIFA and the contact. The first leg portion has a first spring extension extending therefrom towards the printed circuit board while the second leg portion has a second spring extension extending therefrom towards the planar inverted F antenna. The first and second spring extensions are biased towards one another so that the spring extensions are in electrical contact with one another. The spring extensions provide an electrical path that bypasses the inductive path of the spring portion of the contacts. The inductance of the spring is short-circuited by the bypass.

The distance between the PCB and the PIFA has a dimensional tolerance which must be included in the overlap between the spring extensions and the lateral spring forces. The overlap between the extensions compensates for dimensional tolerance stack-up.

The spring contact of this invention may be used in other types of antennas such as microstrip patch antennas.

It is therefore a principal object of the invention to provide an improved switch contact for a wireless communication device including a printed circuit board and a planar inverted F antenna arranged parallel to the printed circuit board and spaced therefrom.

Yet another object of the invention is to provide a switch contact of the type described which include spring extensions at the ends thereof which provide an electrical path that bypasses the inductive path of the spring portion of the contact.

Yet another object of the invention is to provide a switch contact for a wireless communication device which has the ability to compensate for dimensional tolerance stack-up.

These and other objects will be apparent to those skilled in the art.

BRIEF DESCRIPTION OF THE DRAWINGS

FIG. 3A is a side view of the spring contact prior to the spring extensions being overlapped;

FIG. 3B is a view similar FIG. 3A except that the spring extensions have been overlapped;

FIG. 4 is a side view of a prior art spring contact; and

FIG. 5 is a side view illustrating the spring contact of this invention positioned between a planar inverted F antenna and a printed circuit board.

DETAILED DESCRIPTION OF THE EMBODIMENTS

Figure 1:
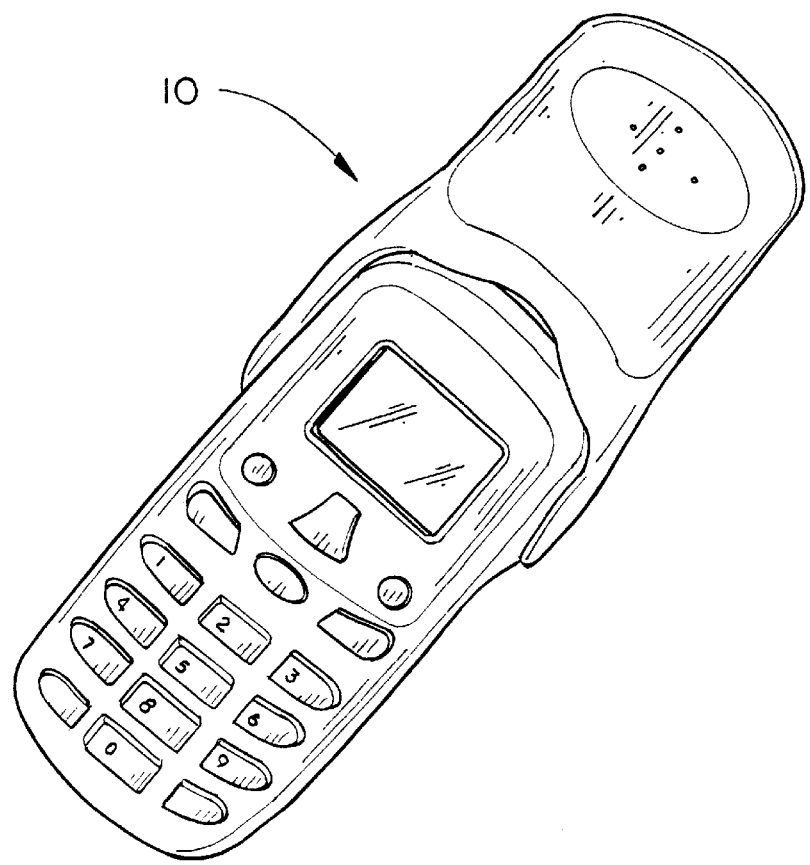
FIG. 1 is a perspective view illustrating a wireless communication device.
Figure 2:
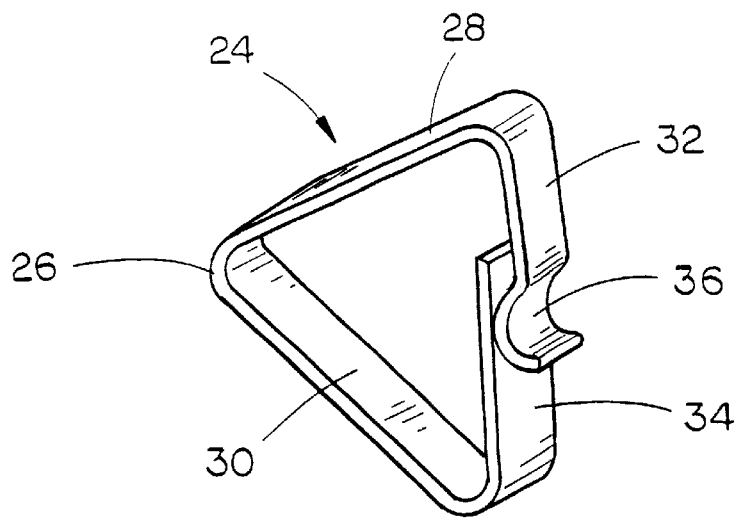
FIG. 2 is a perspective view of the switch contact of this invention.

In the drawings, the numeral 10 refers to a conventional wireless communication device such as a cell phone having an internal antenna such as a planar inverted F antenna (PIFA) and a printed circuit board (PCB). In FIG. 4, the numeral 12 refers to a PIFA while the numeral 14 refers to a PCB. FIG. 4 illustrates a prior art switch contact which is generally referred to by the reference numeral 16. As seen in FIG. 4, the spring contact 16 includes a base portion 18 and leg portions 20 and 22, with the leg portions being in electrical contact with the PIFA 12 and the PCB 14, respectively. Inasmuch as the spring portion of the contact 16 is not enclosed, inductance is present. In most cases, the additional inductance causes the electrical size of the PIFA to be smaller to compensate for the inductance. Smaller electrical size in general means the gain will be lower.

The spring contact of this invention is referred to generally by the reference numeral 24 and includes a base portion 26 having leg portions 28 and 30 extending upwardly and downwardly therefrom, as seen in the drawings. Leg portion 28 is in electrical contact with the feed point on the PIFA 12 while the leg portion 30 is in electrical contact with the PCB 14. Leg portion 28 has a spring extension 32 extending downwardly therefrom towards the PCB 14 while leg portion 30 has a spring extension 34 which extends upwardly therefrom towards PIFA 12. As seen in FIG. 5, spring extension 32 may be provided with a contact portion 36 provided thereon which is preferably arcuate in shape but which may have other shapes as well. For example, the contact portion could be a protruding dimple or the like.

FIG. 3A illustrates the spring contact 24 prior to the spring extensions 32 and 34 being overlapped. Spring extension 32 is inwardly biased while spring extension 34 is outwardly biased. FIG. 3B illustrates the spring contact after the spring extensions 32 and 34 have been overlapped which causes the spring extensions 32 and 34 to be in electrical engagement with one another.

As stated, the spring extensions 32 and 34 are pre-loaded with lateral spring force in opposite directions and press against each other midway between the PIFA 12 and the PCB 14. The spring extensions 32 and 34 thereby provide an electrical path that bypasses the inductive path of the spring portion of the contact. The inductance of the spring is short-circuited by the bypass.

The distance between the PIFA 12 and the PCB 14 has a dimensional tolerance. The dimensional tolerance must be included in the overlap between the spring extensions and the lateral spring forces. The overlap between the spring extensions compensates for dimensional tolerance stack-up. Preferably, the spring contact is formed from a metal material such as beryllium copper or the like.

Although the invention has been described as being ideally suited for use with a PIFA, the spring contact of this invention could be used with other types of antennas such as microstrip patch antennas.

Thus it can be seen that the invention accomplishes at least all of its stated objectives.

I claim:

1. A switch contact for a wireless communication device including a printed circuit board and a planar inverted F antenna arranged parallel to said printed circuit board and spaced therefrom, comprising:

a generally U-shaped spring contact positioned between said printed circuit board and said planar inverted F antenna in a compressed state for electrically connecting said printed circuit board to a feed point on said planar inverted F antenna;

said spring contact including a base portion having spaced-apart first and second leg portions extending therefrom;

said first leg portion being in electrical contact with the feed point on said planar inverted F antenna;

said second leg portion being in electrical contact with said printed circuit board;

said first leg portion having a first spring extension extending therefrom towards said printed circuit board;

said second leg portion having a second spring extension extending therefrom towards said planar inverted F antenna;

said first and second spring extensions being spring biased towards one another so that said spring extensions are in electrical contact with one another.

2. The switch contact of claim 1 wherein one of said first and second spring extensions has a contact portion thereon which contacts the other of said first and second spring extensions.

3. The switch contact of claim 2 wherein said contact portion is arcuate in shape.

4. A switch contact for a wireless communication device including a printed circuit board and an internal antenna arranged parallel to said printed circuit board and spaced therefrom, comprising:

a generally U-shaped spring contact positioned between said printed circuit board and internal antenna in a compressed state for electrically connecting said printed circuit board to a feed point on said internal antenna;

said spring contact including a base portion having spaced-apart first and second leg portions extending therefrom;

said first leg portion being in electrical contact with the feed point on said internal antenna;

said second leg portion being in electrical contact with said printed circuit board;

said first leg portion having a first spring extension extending therefrom towards said printed circuit board;

said second leg portion having a second spring extension extending therefrom towards said internal antenna;

said first and second spring extensions being spring biased towards one another so that said spring extensions are in electrical contact with one another.

5. The switch contact of claim 4 wherein one of said first and second spring extensions has a contact portion thereon which contacts the other of said first and second spring extensions.

6. The switch contact of claim 5 wherein said contact portion is arcuate in shape.

* * * * *